No. 679,044.  
H. L. DE ZENG.  
OPTHALMOSCOPE.  
(Application filed Apr. 29, 1901.)  
Patented July 23, 1901.
(No Model.)
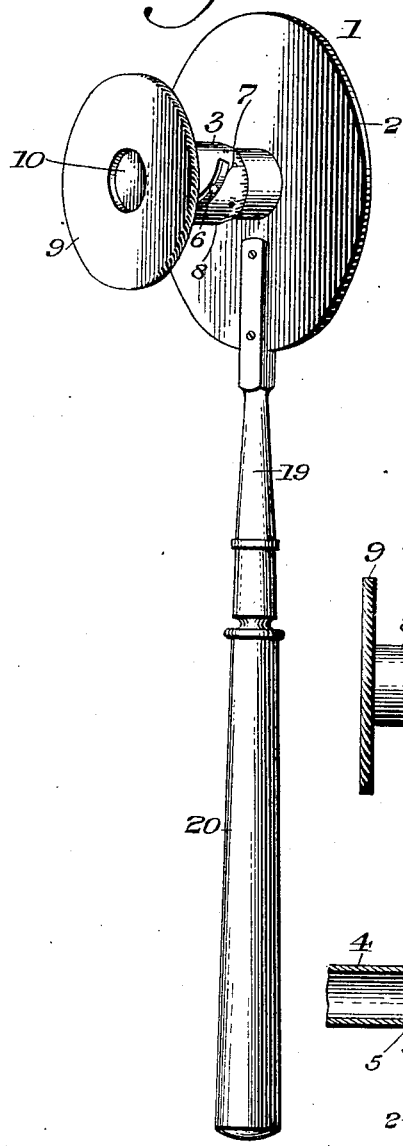
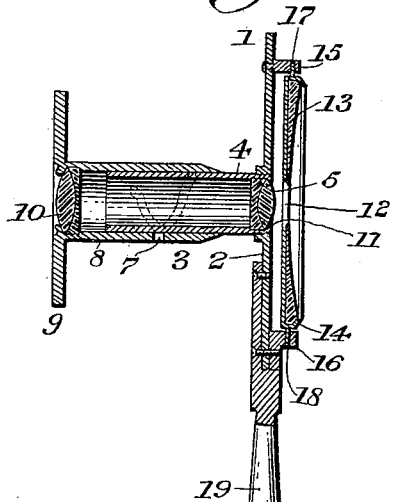
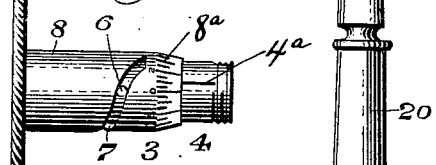
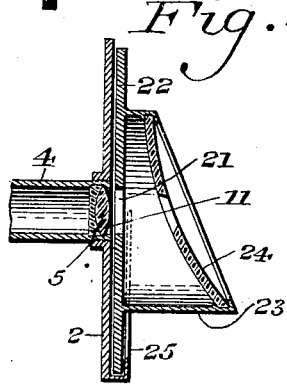
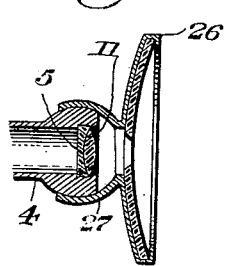
Witnesses  
Inventor  
Henry L. de Zeng.  
By Wiedersheim & Fairbanks  
Attorneys

UNITED STATES PATENT OFFICE.

HENRY LAWRENCE DE ZENG, OF PHILADELPHIA, PENNSYLVANIA, ASSIGNOR TO A. M. DE ZENG, OF SAME PLACE, AND WALTER H. CHAMBERLIN, OF CHICAGO, ILLINOIS.

OPHTHALMOSCOPE.

SPECIFICATION forming part of Letters Patent No. 679,044, dated July 23, 1901.

Application filed April 29, 1901. Serial No. 57,901. (No model.)

*To all whom it may concern:*

Be it known that I, HENRY LAWRENCE DE ZENG, a citizen of the United States, residing in the city and county of Philadelphia, State of Pennsylvania, have invented a new and useful Improvement in Ophthalmoscopes, of which the following is a specification.

My invention consists of a novel construction of an ophthalmoscope which is adapted for viewing, magnifying, and photographing the interior of the eye and measuring its refraction by means of telescopic attachments or other similar or equivalent devices.

To the above ends my invention consists of a suitable body having a reflector supported on one side thereof and a telescope supported on the opposite side thereof.

It also consists in the novel combination of a supporting-body to which the main tube of the telescope is attached, said main tube having a pin therein which is adapted to engage the walls of a spiral groove in the rotatable or adjustable sleeve of the eyepiece carried by said tube.

It also consists of the novel construction of an eyepiece having a graduated scale thereon for determining the relative positions of the eyepiece and the objective.

It further consists of novel details of construction, all as will be hereinafter set forth, and particularly pointed out in the claims.

Figure 1 represents a perspective view of an ophthalmoscope embodying my invention. Fig. 2 represents a vertical sectional view of Fig. 1. Fig. 3 represents a side elevation of the telescope employed in detached position. Fig. 4 represents another view of a reflector and supporting device therefor which may be employed, if desired. Fig. 5 represents a sectional view of a ball or socket attachment between the telescope or body and mirror.

Similar numerals of reference indicate corresponding parts in the figures.

Referring to the drawings, 1 designates an ophthalmoscope, the same consisting of the body 2, at one side of which is secured by any suitable means the telescope 3, the same consisting of the tube 4, which carries the pin 6, attached thereto, said pin being adapted to engage the walls of the spiral groove 7 in the eyepiece or sleeve 8, the latter being rotatably or adjustably mounted upon the main tube 4 and having the milled focusing-disk or steadying-support 9, within which is contained the eye-lens 10. On the tube 4 is a suitable mark $4^a$ and on the tube 8 suitable graduations $8^a$, whereby the rotation of the parts 8 and 4 with respect to each other, and consequently the relative separation of the lenses 10 and 5, may be accurately indicated. By adjusting the lenses so that when observing an emmetropic eye the zero-mark on the scale $8^a$ registers with the mark $4^a$ and when the observed eye is ametropic the graduations on either side of the zero-mark will indicate the amount and nature of the ametropia. The body 2 is provided with an opening 11 in front of the objective 5, which is in alinement with the opening 12 in the reflector 13, which latter in the present instance is mounted upon the supporting-case 14, which latter is adjustably mounted in the upper and lower bearings 15 and 16, respectively, by means of the journals 17 and 18. The body 2 is supported upon the stem 19, which is attached to the handle 20, whereby the ophthalmoscope can be conveniently manipulated.

In the modification seen in Fig. 4 I have shown the main tube 4 of the telescope provided with the objective 5, as already described, and the body 2 having an opening 11 therein, which is in alinement with the opening 21 of the plate 22, which has a cylinder or shell 23 attached thereto, whereby the reflector 24 is carried. It will be noted that said reflector 24 is rotatably supported in an inclined position, the plate 22 being supported by means of the channel or recesses 25, attached to the body 2, or other suitable sustaining devices may be employed, if desired.

In the construction seen in Fig. 5 I have shown the main tube 4 of the telescope as provided with the objective 5, as already described, and another form of reflector 26, adjustably mounted upon said main tube by means of the ball-and-socket connection 27, whereby the plane of the reflector 26 can be universally adjusted in relation to the optical axis of the telescope, or vice versa.

It will be apparent that the main tube 4 can be attached to or supported by the body 2 by any suitable means, although I have shown these parts in the present instance as in threaded engagement. It will also be apparent that the reflectors 13, 24, and 26 can be supported with relation to the main tube 4 or to the telescope by other devices without departing from the spirit of my invention.

The desired adjustments of the relation of the eyepiece 10 with respect to the objective 5 can be effected by other means than that described, as will be apparent to those skilled in the art.

The objective-lens 5 can be either a simple or an achromatic system, according to requirements, and the eye-lens 10 can also be a simple or an achromatic system, as desired.

When it is desired to use my invention in connection with a photographic apparatus, the eyepiece may be removed and a camera substituted, as is evident.

If desired, the principle of the ball-and-socket adjustment seen in Fig. 5 can be applied to the constructions seen in Figs. 2 and 4, said ball-and-socket connection being in front of or behind the body 2, as desired or expedient.

Although I have shown perforated concave reflectors, I do not desire to be limited thereto in every instance, as it will be evident that I may employ a plane or concave reflector having no perforation therein and no coating of quicksilver or other material on the back thereof, the essential feature being to have a reflector in combination with a telescope, which reflector will direct the illuminating or extraneous rays of light into the eye, and a suitable opening in the reflector whereby the rays of light from the observed eye may pass back through the reflector into the telescope.

When a coated reflector is used, I may employ either an opening therein or the coating may be removed at a point in alinement with the optical axis of the telescope.

It will be evident that my invention can be adapted and applied to the various forms of ophthalmoscopes now in use.

It will be apparent that objectives 5 of different power can be used in connection with the eye-lens 10, and vice versa, in accordance with requirements. It will be evident that suitable eyepieces may be used for producing upright images when required and that other changes may be made by those skilled in the art, and I do not therefore desire to be limited in every instance to the exact construction I have herein shown and described.

Having thus described my invention, what I claim as new, and desire to secure by Letters Patent, is—

1. In combination, a telescope and an ophthalmoscope having a reflector for extraneous light and means permitting the transmission of light from the object through said reflector, substantially as described.

2. In combination, a telescope and an ophthalmoscope having a reflector, the latter having an opening in its reflecting-surface in line with the telescope.

3. In combination, a telescope and an ophthalmoscope having an adjustable reflector for extraneous light and means permitting the transmission of light from the object through said reflector.

4. In combination, an adjustable telescope and an ophthalmoscope having an adjustable reflector for extraneous light and means permitting the transmission of light from the object through said reflector.

5. In combination, a telescope, the lenses of which are relatively adjustable, means for measuring said adjustment, and an ophthalmoscope.

6. In combination, a telescope and an ophthalmoscope having a reflector for extraneous light, said reflector supported by a universal joint, and means permitting the transmission of light from the object through said reflector.

HENRY LAWRENCE DE ZENG.

Witnesses:
E. HAYWARD FAIRBANKS,
C. D. McVAY.